United States Patent [19]

Schönert et al.

[11] Patent Number: 6,140,598
[45] Date of Patent: Oct. 31, 2000

[54] METHOD FOR SEPARATING POLYMER-SALT MIXTURES

[75] Inventors: Klaus Schönert, Clausthal-Zellerfeld; Reinhard Wagener, Flörsheim; Joachim Semel, Königstein, all of Germany

[73] Assignee: Ticona GmbH, Germany

[21] Appl. No.: 09/331,377

[22] PCT Filed: Dec. 8, 1997

[86] PCT No.: PCT/EP97/06837

§ 371 Date: Aug. 4, 1999

§ 102(e) Date: Aug. 4, 1999

[87] PCT Pub. No.: WO98/27139

PCT Pub. Date: Jun. 25, 1998

[30] Foreign Application Priority Data

Dec. 19, 1996 [DE] Germany .......................... 196 53 011

[51] Int. Cl.$^7$ ...................................................... B03C 7/00
[52] U.S. Cl. ................................... 209/127.1; 209/127.4; 209/128; 209/129; 209/130
[58] Field of Search .................................. 209/131, 127.1, 209/127.4, 128, 129, 130

[56] References Cited

U.S. PATENT DOCUMENTS

| 4,325,820 | 4/1982 | Whitlock | 209/129 X |
| 5,118,407 | 6/1992 | Beck et al. | 209/2 |
| 5,359,361 | 10/1994 | Iwao et al. | 346/159 |
| 5,385,119 | 1/1995 | Stahl et al. | 209/127.4 X |

FOREIGN PATENT DOCUMENTS

| 42 22 870 | 1/1994 | Germany | B03C 7/02 |
| 08155340 | 6/1996 | Japan | B03C 7/02 |

*Primary Examiner*—Donald P. Walsh
*Assistant Examiner*—Jonathan R. Miller
*Attorney, Agent, or Firm*—Connolly Bove Lodge & Hutz

[57] ABSTRACT

The present invention relates to a method of triboelectric separation of organic polymers and salts, specially organic polymers containing sulfur, such as polyarylene sulfides and a halogenide or a carboxylate of alkaline metals, alkaline earth metals, ammonium or substituted ammonium wherein: a) the mixture to be separated is electrically charged; b) the charged particles are moved by an electric field, preferably perpendicular to the direction of the field, and c) the particles varyingly deviated in the electric field are separated and captured.

11 Claims, 1 Drawing Sheet

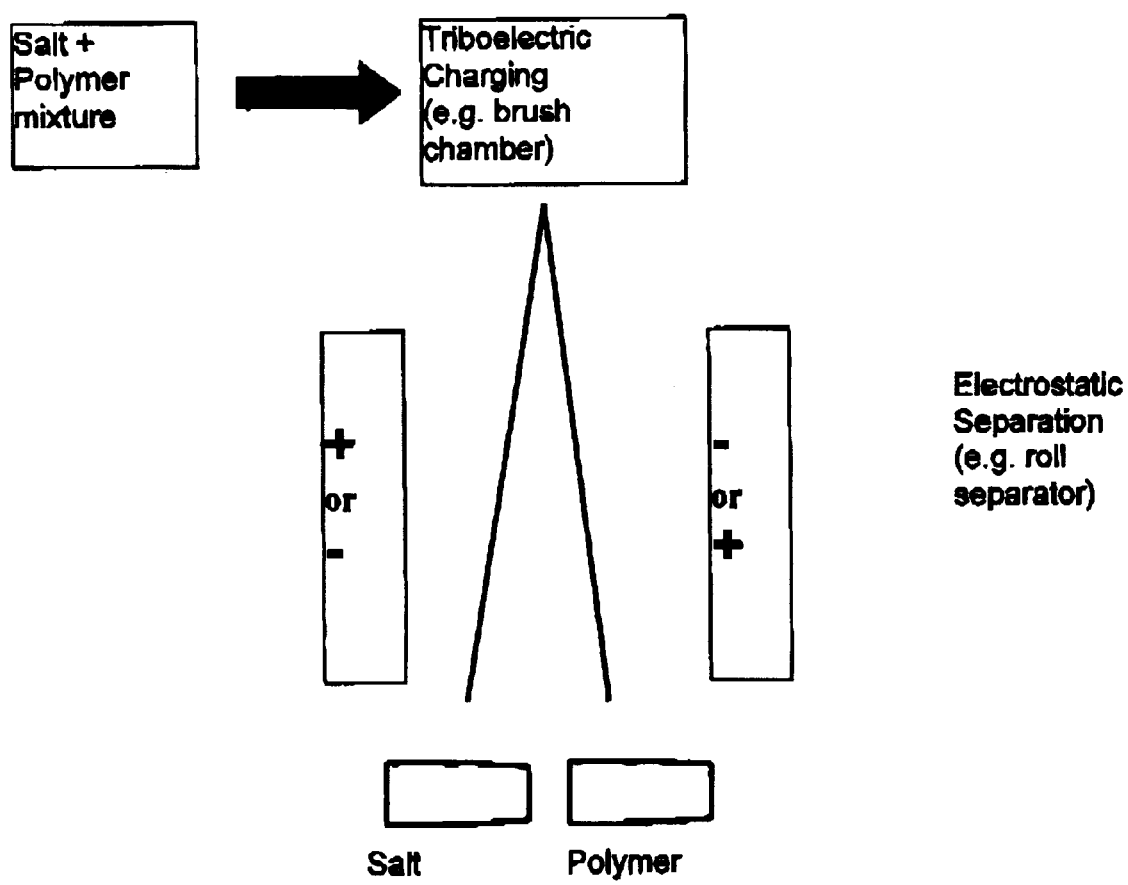

METHOD FOR SEPARATING POLYMER-SALT MIXTURES

The invention relates to a process for the separation of particulate or pulverulent mixtures of organic polymers and salts, in particular sulfur-containing polymers and halides or carboxylates of alkali metals and alkaline earth metals.

In the preparation of polymers by polycondensation, salts are frequently formed as by-products, e.g. in a subsequent neutralization reaction. This also applies, inter alia, to the preparation of polyphenylene sulfide (PPS) from sodium sulfide and para-dichlorobenzene in a polar solvent according to the simplified reaction equation

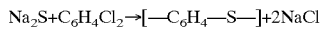

In a known process, the mixture of solvent, polymer and salt present after the reaction is subjected to a flash evaporation to remove the solvent and a solids mixture of polymer and salt is obtained. The salt is removed from this mixture by washing with water and subsequent filtration of the polymer from the washing water. However, these and related processes have the disadvantage that large amounts of salt-containing wastewater are obtained.

For the separation of salts from PPS and a polar solvent, EP-0 220 490 describes a hot filtration or centrifugation at temperatures of above 210° C. However, this procedure requires, in industrial implementation, special constructions of filtration apparatus or centrifuges for this temperature range. In particular, the sealing of the apparatus against the polar solvents used at T>210° C. presents problems.

There is therefore a need for a process for separating salts from organic polymers which operates at moderate temperatures and does not generate large wastewater streams.

It is known that different plastics can be separated from one another by means of triboelectric separation, i.e. by separation of charged particles in a static electric field after they have been charged by mutual friction or friction with apparatus components. It is proposed, for example in DE-C-3 035 649 and in DE-C-4 225 977, for the separation of chemically different plastics within a recycling process. The feed materials used therein are mechanically commuted plastic moldings. Typical particle sizes are in the range from a few millimeters down to fractions of a millimeter, but do not extend down into the very fine particle range of, for example, less than 200 $\mu$m. An apparatus for the triboelectric separation of purely inorganic, mineral solids in the very fine particle size range has been proposed in Powder Technology 86 (1996), 41–47.

It has surprisingly been found that triboelectric separation also gives very good results for solids mixtures of organic polymers and salts in the very fine particle size range down to d=10 $\mu$m. The invention accordingly provides a process for the triboelectric separation of organic polymers and salts, in particular for the separation of such mixtures of organic polymers and salts having mean particle diameters of $\leqq 200$ $\mu$m.

According to a preferred embodiment, the invention provides a process for the separation of sulfur-containing polymers of salts, in particular the halides or carboxylates of alkali metals or alkaline earth metals.

For the purposes of the present invention, the term organic polymer encompasses essentially all known macromolecular, predominantly organic materials. The process of the invention is of particular relevance to polymers which are prepared in a polycondensation process with direct formation of salts or of acids or bases which are to be neutralized subsequently. Examples of such processes are the preparation of polyamides from diamines and diacid chlorides, of polycarbonates from diphenols or diphenoxides and phosgene, or polysulfones, polyether sulfones or polyether ketones from diphenoxides and dihalogenated aromatic hydrocarbons or the preparation of polyarylene siloxanes from diaryldichlorosilanes and diphenoxides. In particular, the term encompasses sulfur-containing polymers.

Sulfur-containing polymers are preferably polymers which comprise arylene sulfide units. The arylene constituents of the arylene sulfide units comprise monocyclic or polycyclic aromatics or linked aromatics. The aromatics can also contain heteroatoms. Examples of such aromatics, which may be substituted or unsubstituted, are benzene, pyridine, biphenyl, naphthalene and phenanthrene. Examples of substituents are $C_1$–$C_6$-alkyl, $C_1$–$C_6$-alkoxy, carboxyl, amino and sulfonic acid groups. Linked aromatics are, for example, biphenyl or aromatics linked via ether bridges (arylene ethers). Preferred sulfur-containing polymers are polyarylene sulfides, in particular polyphenylene sulfide.

Salts can be organic or inorganic, i.e. they can consist of any combination of organic or inorganic cations with organic or inorganic anions. Typical representatives of inorganic salts are the halides of alkali metals or alkaline earth metals which are frequently formed as by-product of a polycondensation. Typical representatives of organic salts are carboxylates of alkali metals, of alkaline earth metals, of ammonium or of organic-substituted ammonium cations which are, for example, used according to the prior art as promoters in the preparation of sulfur-containing polymers. For the purposes of the present invention, carboxylates are the salts of aliphatic carboxylic acids, e.g. acetic acid or propionic acid, or of aromatic carboxylic acids, for example benzoic acid, and also salts of polyfunctional carboxylic acids.

The triboelectrical separation according to the invention of organic polymers and salts is carried out by
  a) electrically charging the mixture to be separated,
  b) moving the charged particles through an electric field, preferably perpendicularly to the field direction, by means of gravity or by means of a stream and
  c) separately collecting the particles which are deflected differently in the electric field.

Suitable feed materials for the process of the invention are free-flowing solids mixtures of one or more polymers and one or more salts. The composition can extend over the entire range from 0 to 100% by weight of polymer and from 100 to 0% of salt. Such mixtures may be formed, for example, in the work-up of a reaction suspension after the steps crystallization, filtration or centrifugation, washing and drying or in spray drying or flash evaporation. The process of the invention gives very good results over a wide range of particle sizes. The process is particularly advantageously employed for the separation of mixtures in the very fine particle size range from d<200 $\mu$m down to d$\leqq$10 $\mu$m. Mixtures in this particle size range are frequently formed in the preparation of heat-resistant polymers such as poly(ether)sulfones and ketones and, in particular, sulfur-containing polymers which dissolve only at high process temperatures and whose crystallization is therefore not easy to control.

The static charging can be carried out essentially by known methods in moving or fluidized beds, in a vibration chamber or in a charger having rotating elements, for example a brush rotor. In a preferred embodiment of the invention, the solids mixture is charged in a brush chamber.

The solids mixture which is introduced through a funnel into a feed tube is continuously pushed by means of a feed screw against a rotating brush which continuously brushes off the material across the entire cross-sectional area of the feed tube, carries it along the wall of the brush chamber and effects triboelectric charging by contact of the particles with one another and with the wall. Good results are achieved using a steel chamber and a steel brush. The chamber can also be made of other materials, for example the polymer to be separated off. The brush can likewise be made of other materials such as polyamides or carbon fibers.

At the opposite side of the brush, a carrier gas is preferably blown in at a high velocity through a narrow slit nozzle so as to discharge the material. If a different arrangement is chosen for triboelectric charging, the material is preferably disposed in a carrier gas stream in essentially the same way. Suitable carrier gases are, for example, air or nitrogen. This gives a dust stream containing charged particles of solids.

The advance rate of the piston, the diameter of the material feed tube, the brush diameter, the speed of rotation of the brush, the composition, relative humidity and velocity of the carrier gas stream can be varied within wide limits depending on requirements and thus enable the solids loading of the dust stream and the electric charge density of the dust to be varied widely.

If necessary, the mixture to be separated can be heated. Heating of the mixture prior to separation can be advantageous, in particular, at a high ambient atmospheric humidity.

In this case, the mixture is preferably heated by customary means to 25–80° C., in particular 35–60° C.

The separation can, in principle, be carried out using all apparatus suitable for triboelectric separation.

The actual separation of the solids mixture occurs during passage through a static electric field in free fall or in a directed gas stream. In the process of the invention, passage through the field preferably occurs perpendicular to the field direction.

The electrodes required for this purpose can be configured as described in the prior art, for example as plate electrodes, louver-type electrodes, tubular electrodes or strip electrodes.

According to a preferred embodiment of the invention, use is made a roll separator as described, for example, in Powder Technology, 86 (1996), pp. 41–47. The dust stream is fed centrally into the roll separator by means of a slit nozzle. The separation electrodes used have a cylindrical shape with convex, curved surfaces. In a preferred embodiment of the invention, they have an elliptical cross section and are in each case embedded in an insulating body, e.g. of polytetrafluoroethene, on the side facing the fall section. This makes possible, in principle, field strengths above the breakdown field strength in the carrier gas. Above the electrode surfaces there are located separation rolls, e.g. of polycarbonate, which are mounted on bearings and rotate around the insulating body. They are preferably driven by a regulatable DC motor via a gear drive on the rear side of the separator. The particles deposit according to the sign of their electric charge on the rotating rolls under the action of the electric field, adhere there and are conveyed from the separation zone into the region of the stripping electrodes which are embedded in the rear side of the insulating bodies. The stripping electrodes have, like the separation electrodes, a cylindrical or elliptical cross section with the same axis ratio, but are oppositely charged. As a result, the particles having a charge of the same sign which are adhering to the rolls are stripped. To further clean the roll surfaces, use is made of mechanical devices such as scrapers or brushes which are at ground potential. The separated solid is finally collected in a receiver. The middle fraction which has not been deposited on either of the two separation electrodes is, after passing through the fall section, drawn off by suction and again fed to the triboelectric separator from the top.

The field strength applied for the separation is preferably in the range 0.1–30 MV/m, in particular 1–5 MV/m.

The triboelectric separation can be carried out in a single stage or else, to achieve particularly high product purities, in a plurality of stages.

In the case of multistage sorting, a distinction is made between presorting in the first stage, also known as a "rougher", cleaning in the "cleaner" stage, after-sorting in the "scavenger" stage.

The rougher produces two products which are each enriched in either the polymer or the salt. These two products are referred to here as crude polymer and crude salt. The crude polymer is cleaned in the cleaner stage in which polymer is always lost with the salt fraction (cleaner salt). To avoid such losses, the cleaner salt can be recirculated to the rougher. The scavenger recovers the polymer remaining in the crude salt. The polymer fraction from the scavenger is usually likewise recirculated to the rougher. The cleaner and scavenger stages can themselves have a plurality of stages. The cleaner determines the purity of the polymer and the scavenger determines the polymer losses.

It is also possible for the desired component to accumulate in the middle fraction in the cleaner or scavenger and for this middle fraction to be discharged as product, while the fractions taken off from the electrodes are fed to the middle fraction circuit of the rougher.

EXAMPLES

Example 1

The following samples were used for the triboelectric separation: Fortron®, a polyphenylene sulfide obtainable from Fortron Industries, North Carolina, U.S.A. The sample had the following particle size distribution:

| $d_{10} = 47\ \mu m$ | $d_{50} = 72\ \mu m$ | $d_{90} = 106\ \mu m$ |
| --- | --- | --- |

Here, $d_{xx}$ is that particle diameter below which the diameter of xx % of the total sample lies. This sample is designated below as Fortron G (FG).

In addition, sodium chloride having the particle size distribution:

| $d_{10} = 21\ \mu m$ | $d_{50} = 50\ \mu m$ | $d_{90} = 78\ \mu m$ |
| --- | --- | --- |

This sample is designated as salt G (SG).

Table 1 shows the experimental results obtained in the triboelectric separation of mixtures of these substances in the ratios by mass FG/SG=50:50, FG/SG=90:10 and FG/SG=10:90 in the feed stream. Here, the abbreviations have the following meanings:

| | |
|---|---|
| v | mean entry velocity of the air into the brush chamber [m/s] |
| U | applied DC potential [kV] |
| F | Fortron |
| S | Salt |
| M+, Mm, M− | percentage by mass of the positively charged, middle and negatively charged fractions based on the total mass of all three fractions |
| Cf+, CFm, CF− | percentage by mass of Fortron in the positively charged, middle and negatively charged fractions based on the mass of the individual fraction |
| CS+, CSm, CS− | percentage by mass of salt in the positively charged, middle and negatively charged fractions based on the mass of the individual fraction |
| RF+, RFm, RF− | percentage by mass of the Fortron discharged in the positively charged, middle and negatively charged fractions, based on the total mass of the Fortron discharged in all three individual fractions |
| RS+, RSm, RS− | percentage by mass of the salt discharged in the positively charged, middle and negatively charged fractions, based on the total mass of salt discharged in all three individual fractions |

The experiments were carried out using a rotational brush speed of 900 min$^{-1}$. With the aid of the electrode spacing, the following relationship between the applied DC potential U and the field strength E is obtained:

$$E/(MV/m)=0.1*U/kV$$

Example 2

The following samples were used for the triboelectric separation: Fortron®, a polyphenylene sulfide obtainable from Fortron Industries, North Carolina, U.S.A. The sample had the following particle size distribution:

| $d_{10} = 11\ \mu m$ | $d_{50} = 20\ \mu m$ | $d_{90} = 28\ \mu m$ |
|---|---|---|

Here, $d_{xx}$ is that particle diameter below which the diameter of xx % of the total sample lies. This sample is designated below as Fortron A (FA).

In addition, sodium chloride having the particle size distribution:

| $d_{10} = 1.3\ \mu m$ | $d_{50} = 9\ \mu m$ | $d_{90} = 13\ \mu m$ |
|---|---|---|

The sample is designated as salt F1 (SF1).

Table 2 shows the experimental results obtained in the triboelectric separation of mixtures of these substances in a ratio by mass FA/SF1=50:50 in the feed stream and Table 3 shows the results for a ratio by mass FA-SF1=30:70 in the feed stream. The meanings of the abbreviations are explained in Example 1.

TABLE 1

Fortron G, Salt G

| Mixture of F/S | v [m/S] | U [kV] | | M+ | CF+ CS+ | RF+ RS+ | Mn | CFm CSm | RFm RSm | M− | CF− CS− | RF− RS− |
|---|---|---|---|---|---|---|---|---|---|---|---|---|
| 50:50 | 40 | 25 | F | 24 | 89 | 43 | 39 | 56 | 44 | 37 | 18 | 13 |
| | | | S | | 11 | 5 | | 44 | 34 | | 82 | 61 |
| | 60 | 20 | F | 34 | 92 | 63 | 35 | 50 | 33 | 31 | 6 | 4 |
| | | | S | | 8 | 5 | | 50 | 37 | | 94 | 58 |
| | 60 | 25 | F | 25 | 86 | 43 | 51 | 52 | 53 | 24 | 8 | 4 |
| | | | S | | 14 | 7 | | 48 | 49 | | 92 | 44 |
| | 100 | 20 | F | 26 | 87 | 45 | 52 | 49 | 52 | 22 | 6 | 3 |
| | | | S | | 13 | 7 | | 51 | 52 | | 94 | 41 |
| 10:90 | 60 | 20 | F | 50 | 100 | 56 | 36 | 88 | 35 | 14 | 61 | 9 |
| | | | S | | 0 | 0 | | 12 | 45 | | 39 | 55 |
| 90:10 | 60 | 20 | F | 12 | 70 | 84 | 38 | 2 | 6 | 50 | 2 | 10 |
| | | | S | | 30 | 4 | | 98 | 42 | | 98 | 54 |

TABLE 2

Fortron A/Salt F1, mixing ratio FA/SF1 = 50:50

| V [m/S] | U [kV] | | M+ | CF+ CS+ | RF+ RS+ | Mn | CFm CSm | RFm RSm | M− | CF− CS− | RF− RS− |
|---|---|---|---|---|---|---|---|---|---|---|---|
| 60 | 20 | F | 28 | 69 | 39 | 42 | 52 | 43 | 30 | 30 | 18 |
| | | S | | 31 | 17 | | 48 | 41 | | 70 | 42 |
| 60 | 25 | F | 24 | 66 | 32 | 40 | 58 | 46 | 36 | 30 | 22 |
| | | S | | 34 | 16 | | 42 | 34 | | 70 | 50 |

TABLE 2-continued

Fortron A/Salt F1, mixing ratio FA/SF1 = 50:50

| V [m/S] | U [kV] | | M+ | Positively charged fraction CF+ CS+ | RF+ RS+ | Mn | Middle fraction CFm CSm | RFm RSm | M− | Negatively charged fraction CF− CS− | RF− RS− |
|---|---|---|---|---|---|---|---|---|---|---|---|
| 100 | 20 | F | 24 | 68 | 33 | 40 | 62 | 48 | 36 | 26 | 19 |
|  |  | S |  | 32 | 15 |  | 38 | 32 |  | 74 | 53 |
| 100 | 25 | F | 30 | 70 | 42 | 40 | 52 | 42 | 30 | 26 | 16 |
|  |  | S |  | 30 | 18 |  | 48 | 38 |  | 74 | 44 |
| 140 | 20 | F | 18 | 71 | 26 | 44 | 60 | 53 | 38 | 28 | 21 |
|  |  | S |  | 29 | 10 |  | 40 | 35 |  | 72 | 55 |
| 140 | 25 | F | 21 | 68 | 29 | 46 | 62 | 56 | 33 | 23 | 15 |
|  |  | S |  | 32 | 13 |  | 38 | 36 |  | 77 | 51 |

TABLE 3

Fortron A/Salt F1, mixing ratio FA/SF1 = 30:70

| V [m/S] | U [kV] | | M+ | Positively charged fraction CF+ CS+ | RF+ RS+ | Mn | Middle fraction CFm CSm | RFm RSm | M− | Negatively charged fraction CF− CS− | RF− RS− |
|---|---|---|---|---|---|---|---|---|---|---|---|
| 60 | 20 | F | 28 | 54 | 48 | 40 | 28 | 35 | 38 | 14 | 17 |
|  |  | S |  | 46 | 18 |  | 72 | 40 |  | 86 | 32 |
| 60 | 25 | F | 18 | 54 | 32 | 46 | 34 | 52 | 36 | 14 | 16 |
|  |  | S |  | 46 | 13 |  | 66 | 43 |  | 86 | 44 |
| 140 | 20 | F | 17 | 57 | 31 | 37 | 44 | 52 | 46 | 11 | 17 |
|  |  | S |  | 43 | 11 |  | 56 | 30 |  | 89 | 59 |
| 140 | 25 | F | 20 | 53 | 35 | 35 | 45 | 52 | 45 | 9 | 13 |
|  |  | S |  | 47 | 13 |  | 55 | 28 |  | 91 | 59 |

What is claimed is:

1. A process for the triboelectric separation of organic polymers and salts, which comprises
   a) electrically charging a mixture of organic polymer and salt particles to be separated
   b) moving the mixture of charged particles through an electric field and
   c) separately collecting the particles which are deflected differently in the electric field.

2. The process for the triboelectric separation of organic polymers and salts as claimed in claim 1, wherein the charged particles are moved perpendicularly to a field direction.

3. The process for the triboelectric separation of organic polymers and salts as claimed in either of the preceding claims, wherein the mean particle diameter of the mixture to be separated is less than 200 µm.

4. The process for the triboelectric separation of organic polymers and salts as claimed in any one of the preceding claims, wherein the polymer comprises a sulfur-containing polymer.

5. The process for the triboelectric separation of organic polymers and salts as claimed in claim 4, wherein the polymer comprises polyphenylene sulfide.

6. The process for the triboelectric separation of organic polymers and salts as claimed in any one of the preceding claims, wherein the salt comprises a halide or carboxylate of an alkali metal, an alkaline earth metal, ammonium or a substituted ammonium.

7. The process for the triboelectric separation of organic polymers and salts as claimed in claim 6, wherein the salt comprises sodium chloride.

8. The process for the triboelectric separation of organic polymers and salts as claimed in any one of the preceding claims, wherein the charging is carried out in a brush chamber.

9. The process for the triboelectric separation of organic polymers and salts as claimed in claim 1, wherein separation is carried out in a roll separator.

10. The process for the triboelectric separation of organic polymers and salts as claimed in claim 9, wherein the roll separator comprises
   a) cylindrical stripping electrodes having convexly curved surfaces embedded in an insulating body on a side facing a dust stream,
   b) cylindrical stripping electrodes having convexly curved surfaces embedded in the insulating body on a side facing away from the dust stream,
   c) rolls which rotate around the insulating bodies and convey particles deposited on the separation electrode to the stripping electrodes.

11. The process for the triboelectric separation of organic polymers and salts as claimed in claim 9, wherein the roll separator comprises
   a) elliptical separation electrodes embedded in an insulating body on a side facing a dust stream,
   b) elliptical stripping electrodes embedded in the insulating body on a side facing away from the dust stream,
   c) rolls which rotate around the insulating bodies and convey particles deposited on the separation electrode to the stripping electrodes.

* * * * *

UNITED STATES PATENT AND TRADEMARK OFFICE
CERTIFICATE OF CORRECTION

PATENT NO. : 6,140,598
DATED : October 31, 2000
INVENTOR(S) : Klaus Schönert, Reinhard Wagener and Jachim Semel

It is certified that error appears in the above-indentified patent and that said Letters Patent is hereby corrected as shown below:

in column 3, line 43, insert - - of - - after the word "made".

In the claims, column 7 line 51 (claim 3, line 2 ), delete [either of the preceding claims] and replace with - - claim 1 - -.

In the claims, column 7 line 55 (claim 4, line 2 - 3), delete [in any on of the preceding claims] and replace with - - claim 1 - -.

In the claims, column 7 line 61 (claim 6, line 2 - 3), delete [any on of the preceding claims] and replace with - - claim 1 - -.

In the claims, column 8 line 38 (claim 8, line 2 - 3), delete [any on of the preceding claims] and replace with - - claim 1 - -.

Signed and Sealed this

Fifteenth Day of May, 2001

*Attest:*

NICHOLAS P. GODICI

*Attesting Officer*      *Acting Director of the United States Patent and Trademark Office*